US012712269B2

(12) United States Patent
Kim et al.

(10) Patent No.: US 12,712,269 B2
(45) Date of Patent: Aug. 18, 2026

(54) SIGNAL TRANSMISSION CONTROL DEVICE AND ELECTRONIC DEVICE INCLUDING THE SAME

(71) Applicants: SK hynix Inc., Icheon-si (KR); SEOUL NATIONAL UNIVERSITY R & DB FOUNDATION, Seoul (KR)

(72) Inventors: Sang-Koog Kim, Seoul (KR); Bojong Kim, Seoul (KR); Junyoung Kim, Seoul (KR); Hae-chan Jeon, Seoul (KR)

(73) Assignees: SK hynix Inc., Icheon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 125 days.

(21) Appl. No.: 18/782,611

(22) Filed: Jul. 24, 2024

(65) Prior Publication Data

US 2025/0273863 A1 Aug. 28, 2025

(30) Foreign Application Priority Data

Feb. 23, 2024 (KR) ........................ 10-2024-0026403

(51) Int. Cl.

| | |
|---|---|
| ***H01Q 9/04*** | (2006.01) |
| ***H01Q 1/38*** | (2006.01) |
| ***H01Q 15/00*** | (2006.01) |
| ***H04B 17/391*** | (2015.01) |

(52) U.S. Cl.

CPC ............. *H01Q 9/0407* (2013.01); *H01Q 1/38* (2013.01); *H01Q 15/0086* (2013.01); *H04B 17/3912* (2015.01)

(58) Field of Classification Search

CPC .... H01Q 9/0407; H01Q 1/38; H01Q 15/0086; H04B 17/3912

See application file for complete search history.

(56) References Cited

U.S. PATENT DOCUMENTS

| | | | | |
|---|---|---|---|---|
| 8,143,976 | B2 * | 3/2012 | Wyland ................ | H05K 1/0251 333/260 |
| 2007/0262834 | A1 * | 11/2007 | Albacete ............ | H01P 1/20381 333/204 |
| 2008/0079646 | A1 * | 4/2008 | Stuart .................... | H01Q 9/285 343/795 |

(Continued)

FOREIGN PATENT DOCUMENTS

| | | |
|---|---|---|
| KR | 10-1829816 B1 | 2/2018 |

OTHER PUBLICATIONS

Biswanath Bhoi et al., "Robust magnon-photon coupling in a planar-geometry hybrid of inverted split-ring resonator and YIG film," Scientific Reports, 2017, 7: 11930.

(Continued)

*Primary Examiner* — Hai V Tran

(57) ABSTRACT

A signal transmission control device may include a device layer including a conductive layer and a dielectric layer disposed on the conductive layer, and a conductive line disposed on the dielectric layer and extending across a first inverted split ring resonator (ISRR) and a second inverted split ring resonator (ISRR). The device layer may define the first ISRR and the second ISRR spaced apart from each other, and a signal transmission characteristic between a first end and a second end of the conductive line may be controlled by the first ISRR and the second ISRR.

15 Claims, 14 Drawing Sheets

(56) References Cited

U.S. PATENT DOCUMENTS

| | | | | |
|---|---|---|---|---|
| 2010/0097271 | A1* | 4/2010 | Chang | H01Q 1/425<br>343/700 MS |
| 2017/0186710 | A1* | 6/2017 | Yoon | H01L 23/49838 |
| 2017/0237136 | A1* | 8/2017 | Peng | H01P 3/081<br>333/204 |
| 2018/0261415 | A1* | 9/2018 | Koul | H01P 1/2005 |
| 2022/0123474 | A1* | 4/2022 | Kosaka | H01Q 1/46 |

OTHER PUBLICATIONS

Cihan Asci et al., "Design and implementation of magnetically-tunable quad-band filter utilizing split-ring resonators at microwave frequencies," Scientific Reports, 2020, 10: 1050.

* cited by examiner

Experiment

SIGNAL TRANSMISSION CONTROL DEVICE AND ELECTRONIC DEVICE INCLUDING THE SAME

CROSS-REFERENCE TO RELATED APPLICATION

The present application claims, under 35 U.S.C. § 119 (a), the benefit of Korean patent application No. 10-2024-0026403, filed on Feb. 23, 2024, which is herein incorporated by reference in its entirety.

BACKGROUND

1. Field

Embodiments of the present disclosure relates to devices/apparatuses related to signal transmission, and methods and applications related thereto, and more particularly, to devices/apparatuses capable of controlling signal transmission characteristics, and methods and applications related thereto.

2. Description of the Related Art

The propagation-direction dependence of wave interferences is emerging as an important research topic due to its wide applicability to electrodynamics, acoustics, matter waves and quantum electronics. The study of transmitted photons and their role in signal transmission, filtering and light-matter interactions is attracting interest due to the potential of quantum information processing technologies. Interests in manipulating transmitted photons in related fields such as meta-materials, where remarkably progress has been made in achieving perfect absorption and transmission, electromagnetically induced transparency (EIT) and electromagnetically induced absorption (EIA) are increasing. However, reflected photons not only reduce transmission and absorption efficiencies, but also interfere with excitation and may negatively affect the performance of the entire optical system, such as the frequency stability of the excitation laser. As a result, the development of structures which may minimize reflection and appropriately control transmission and absorption may be desirable for certain applications.

To achieve zero reflection, transformation optics may provide a solution by using inhomogeneous, anisotropic materials (e.g., transformation media). In the context of photonics, these advances may have a potential to facilitate development of next-generation optical isolators, circulators, unidirectional biosensors, switches, and modulators. Furthermore, optical systems having parity-time (PT) symmetry provide another approach to suppress reflections. To date, PT optical materials have exhibited phenomena such as single-mode lasers, coherent prefect absorbers, optical nonreciprocal propagation, cloaking objects, and unidirectional reflectionlessness.

Recently, attention has been focused on investigating unidirectional reflectionless phenomena based on balanced gains and losses. Furthermore, unidirectional reflectionless property was investigated in a non-Hermitian system without balanced gain and loss. Theoretically, unidirectional invisibility has been proven at the EP (exceptional point) of the PT symmetric periodic structure. Furthermore, the occurrence of unidirectional light reflection at EP within a passive waveguide structure was experimentally verified.

However, existing methods require complex structural design to implement unidirectional reflectionless absorption characteristics, etc., and have issues such as poor usability and low degree of freedom.

SUMMARY

The technological object to be achieved by embodiments of the present disclosure is to provide a signal transmission control device which may secure excellent signal control characteristics with a simpler structure as compared to existing methods.

In addition, the technological object to be achieved by embodiments of the present disclosure is to provide a signal transmission control device which may secure excellent performance even with a simple structure and small size.

In addition, the technological object to be achieved by embodiments of the present disclosure is to provide a signal transmission control device which is easy to manufacture in a small size and whose frequency of use may be expanded to a high-frequency range (e.g., several terahertz (THz) or more).

Furthermore, the technological object to be achieved by embodiments of the present disclosure is to provide an electronic device including the signal transmission control device described above.

The objects to be achieved by embodiments of the present disclosure are not limited to the objects mentioned above, and other objects not mentioned will be understood by those skilled in the art from the description below.

According to one embodiment of the present invention, a signal transmission control device comprises a device layer including a conductive layer and a dielectric layer disposed on one surface of the conductive layer, wherein the device layer defines a first inverted split ring resonator (ISRR) and a second inverted split ring resonator (ISRR) that are spaced apart from each other, and a conductive line disposed on the dielectric layer and extending across the first ISRR and the second ISRR. A signal transmission characteristic between a first end and a second end of the conductive line is controlled by the first ISRR and the second ISRR.

An orientation of the first ISRR and an orientation of the second ISRR may be different from each other.

The orientation of the first ISRR and the orientation of the second ISRR may be rotated by about 90° with respect to each other.

The first ISRR may have a gap orientation rotated by about 90° with respect to the first end of the conductive line, and the second ISRR may have a gap orientation rotated by about 180° with respect to the first end of the conductive line.

The first ISRR and the second ISRR may have a different resonance frequency.

The first ISRR may have a first resonance frequency, the second ISRR may have a second resonance frequency, and the signal transmission control device may have electromagnetically induced transparency (EIT) characteristic in a frequency range between the first resonance frequency and the second resonance frequency.

The first ISRR may have a first resonant frequency, the second ISRR may have a second resonant frequency, and the signal transmission control device may have a signal transmission characteristic of about 80% or more in the frequency range between the first resonance frequency and the second resonance frequency.

The first ISRR may have a first resonance frequency, the second ISRR may have a second resonance frequency, and the signal transmission control device may have an asymmetric signal reflection characteristic depending on a signal transmission direction between the first end and the second end of the conductive line in a frequency range between the first resonance frequency and the second resonance frequency.

Transmittivity, reflectivity, and absorptivity of signal transmission between the first end and the second end of the conductive line may be adjusted according to a distance between the first ISRR and the second ISRR.

The signal transmission control device may have a unidirectional reflectionless absorption characteristic. The unidirectional reflectionless absorption characteristic may be defined as a characteristic having signal reflection of about 10% or less and signal absorption of about 90% or more with respect to a specific direction.

The first ISRR may include a first opening pattern formed as a shape of a quadrangle split ring in a first region of the conductive layer, and the second ISRR may include a second opening pattern formed as a shape of a quadrangle split ring in a second region of the conductive layer.

The conductive line may be disposed on the first ISRR and the second ISRR to cross a central portion of each of the first ISRR and the second ISRR.

An electrical signal may be input to any one of the first end and the second end of the conductive line, and electromagnetic waves may be generated in the conductive line by the electrical signal.

According to another embodiment of the present disclosure, an electronic device including the above-described signal transmission control device is provided.

According to embodiments of the present disclosure, it is possible to implement a signal transmission control device capable of securing excellent signal control characteristics with a significantly simpler structure as compared to existing methods. Furthermore, according to embodiments of the present invention, it is possible to implement a signal transmission control device which may secure excellent performance even with a simple structure and small size. In addition, according to embodiments of the present disclosure, it is possible to implement a signal transmission control device which is easy to manufacture in a small size and whose frequency of use may be expanded to a high frequency range (e.g., a range of several terahertz (THz) or more).

According to one embodiment, a signal transmission control device having excellent signal control characteristics may be implemented by using indirect interaction between two inverted split ring resonators (ISRRs) using traveling wave phase interference. The transmittivity, reflectivity, and absorptivity of the signal transmission of the signal transmission control device may be easily adjusted by adjusting the distance (gap) between the two inverted split ring resonators (ISRRs). Furthermore, unidirectional reflectionless absorption (i.e., unidirectional reflectionless nearly perfect absorption) characteristics may be implemented with a simple configuration without complicated design by using the structure and the method according to the embodiments. The signal transmission control devices according to the embodiments of the present disclosure may have beneficial aspects in that it is easily manufactured in small sizes, the frequency of use may be expanded to several terahertz (THz) or more, and high usability and freedom are realized. The signal transmission control devices according to embodiments of the present disclosure may be usefully used in various electronic devices.

However, the effects of embodiments of the present disclosure are not limited to the above effects and may be expanded in various ways without departing from the technological spirit and scope of embodiments of the present disclosure.

DETAILED DESCRIPTION

Hereinafter, embodiments of the present disclosure will be described in detail with reference to the accompanying drawings.

The embodiments of the present disclosure to be described below are provided to more clearly explain some of various embodiments of the present disclosure to those skilled in the art, and the scope of embodiments of the present disclosure not limited by the following embodiments, and the embodiments may be modified in many different forms.

The terms indicating a singular form used herein may include plural forms unless the context clearly indicates otherwise. Also, as used herein, the terms, "comprise" and/or "comprising" specify the presence of the stated shape, step, number, operation, member, element, and/or group thereof and does not exclude the presence or addition of one or more other shapes, steps, numbers, operations, elements, elements and/or groups thereof. In addition, the term, "connection" used in this specification means not only a direct connection of certain members, but also an indirect connection in which other members are interposed between the members.

In addition, in the present specification, when a member is said to be located "on" another member, this arrangement includes not only a case in which a member is in contact with another member, but also a case where another member exists between the two members. As used herein, the term, "and/or" includes any one and all combinations of one or more of the listed items. In addition, the terms of degree such as "about" and "substantially" used in the present specification are used as a range of values or degrees, or as a meaning close thereto, taking into account inherent manufacturing and substance tolerances, and exact or absolute numbers provided to aid in the understanding of this application are used to prevent the infringers from unfairly exploiting the stated disclosure.

Hereinafter, embodiments of the present disclosure will be described in detail with reference to the accompanying drawings. A size or a thickness of areas or parts shown in the accompanying drawings may be exaggerated for clarity of the specification and convenience of description. The same reference numbers indicate the same configuring elements throughout the detailed description.

Figure 1:
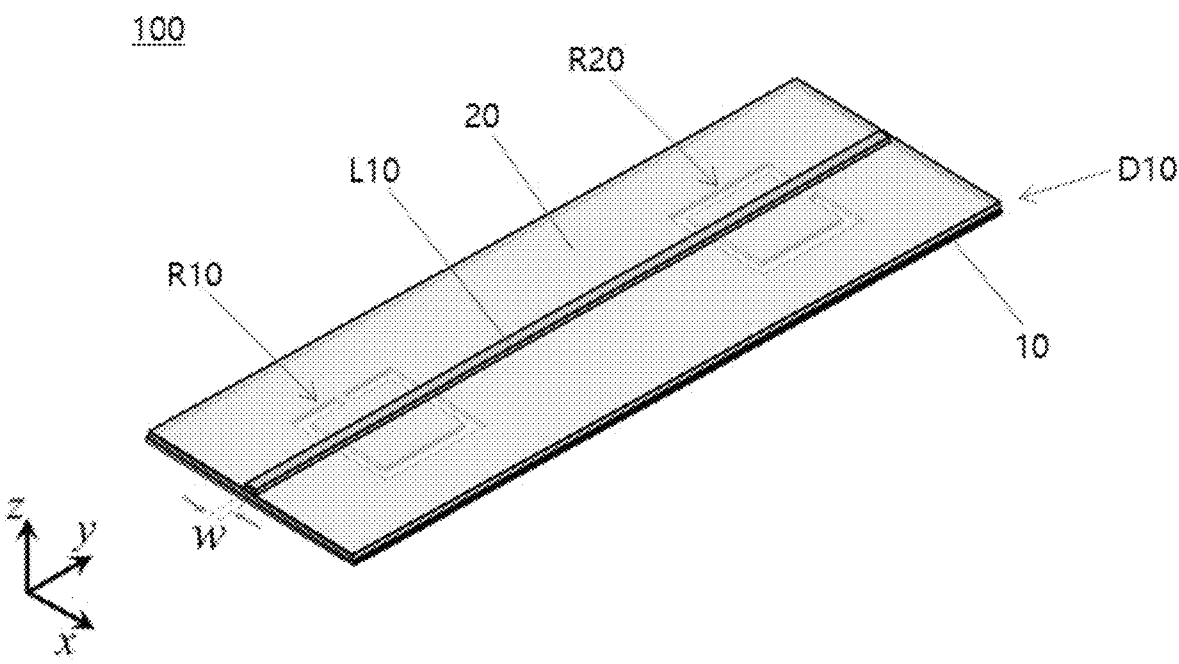
FIG. 1 and FIG. 2 are perspective diagrams illustrating a signal transmission control element according to an embodiment of the present disclosure.
Figure 2:
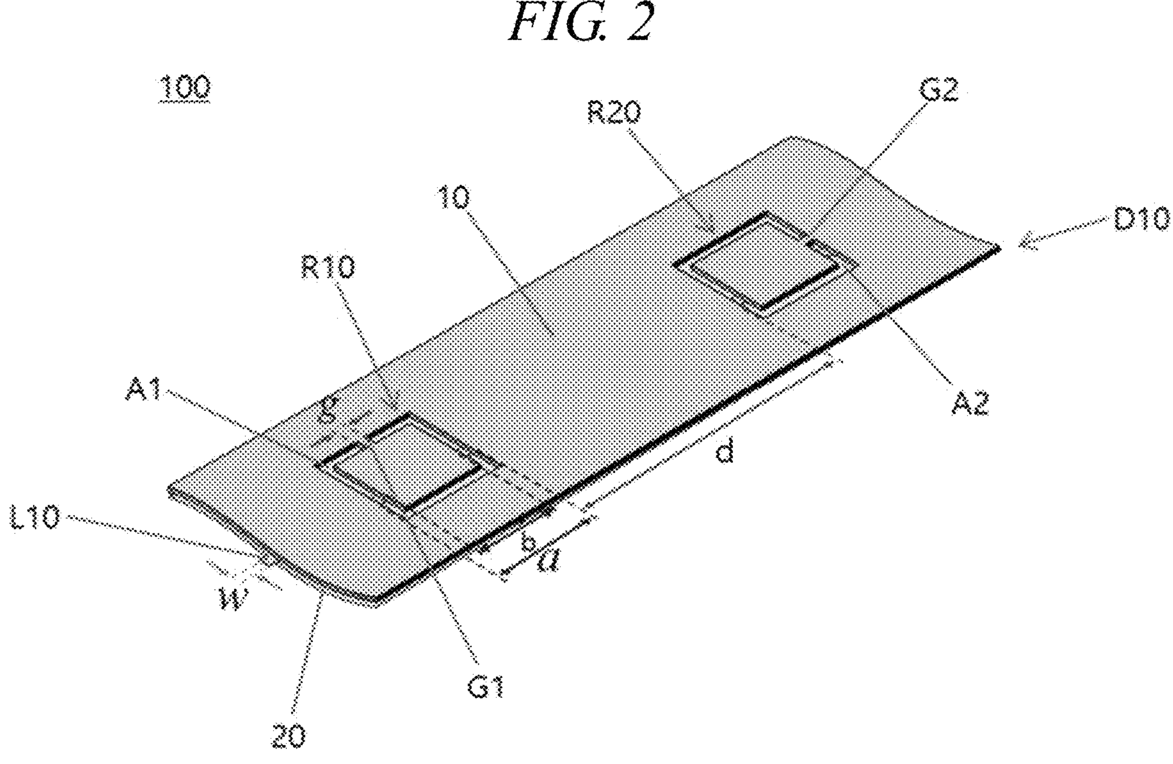

FIG. 1 and FIG. 2 are perspective diagrams illustrating a signal transmission control device (or signal transfer control device) 100 according to an embodiment of the present disclosure. FIG. 1 shows the front side of the signal transmission control device 100, and FIG. 2 shows the rear side of the signal transmission control device 100. The signal transmission control device 100 may also be referred to as a 'signal control element.'

Referring to FIGS. 1 and 2, the signal transmission control device 100 according to an embodiment of the present disclosure may include a device layer D10. The device layer D10 may include a conductive layer 10 and a dielectric layer 20 disposed on a surface (e.g., an upper surface) of the conductive layer 10. Furthermore, first and second inverted split ring resonators (ISRR) R10 and R20 spaced apart from each other may be defined in the device layer D10. The conductive layer 10 and the dielectric layer 20 may define the first and second inverted split ring resonators R10 and R20. In other words, the first and second inverted split ring resonators R10 and R20 may be defined by the conductive layer 10 and the dielectric layer 20.

The conductive layer 10 may include a metal, or a metallic material, or both. For example, the conductive layer 10 may be a metal layer or a metallic material layer. As a non-limiting example, the conductive layer 10 may include Cu, but embodiments of the present disclosure are not limited thereto. The conductive layer 10 may include at least one of various conductive materials." The dielectric layer 20 may include a dielectric material, and the dielectric material may be an electrically insulating material. As a non-limiting example, the dielectric layer 20 may include a ceramic-based dielectric material, or an epoxy resin-based dielectric material, or both, but embodiments of the present disclosure are not limited to them. As a non-limiting example, the dielectric material may include non-metallic materials such as polytetrafluoroethylene (PTFE), glass fiber, hydrocarbon resin, and the like. The dielectric layer 20 may include at least one of various dielectric materials.

The first inverted split ring resonator R10 may include a first opening pattern A1 formed as a split ring shape in a first region of the conductive layer 10. As a non-limiting example, the first opening pattern A1 may have a quadrangle (square/rectangular) split ring shape. The second inverted split ring resonator R20 may include a second opening pattern A2 formed as a split ring shape in a second region of the conductive layer 10. As a non-limiting example, the second opening pattern A2 may have a quadrangle (square/rectangular) split ring shape.

It may be understood that a first portion of the conductive layer 10 defining the first opening pattern A1 and a first portion of the dielectric layer 20 disposed in contact with the first portion of the conductive layer 10 may constitute the first inverted split ring resonator R10. In other words, it may be understood that the first portion of the conductive layer 10 existing around the first opening pattern A1 and the first portion of the dielectric layer 20 disposed in contact therewith may constitute the first inverted split ring resonator R10. In addition, it may be understood that a second portion of the conductive layer 10 defining the second opening pattern A2 and a second portion of the dielectric layer 20 disposed in contact with the second portion of the conductive layer 10 may constitute the second inverted split ring resonator R20. In other words, it may be understood that the second portion of the conductive layer 10 existing around the second opening pattern A2 and the second portion of the dielectric layer 20 disposed in contact therewith may constitute the second inverted split ring resonator R20.

The interior (inner region) of each of the first and second opening patterns A1 and A2 may be an empty space. In this case, air may exist inside the first and second opening patterns A1 and A2. The air existing inside the first and second opening patterns A1 and A2 may be considered a type of dielectric. However, in some cases, the inside of the first and second opening patterns A1 and A2 may be filled with a dielectric material. As a non-limiting example, the first and second opening patterns A1 and A2 may be formed through an etching process. In this case, the first opening pattern A1 and the second opening pattern A2 may be referred to as a first etching portion and a second etching portion, respectively.

The first inverted split ring resonator R10 and the second inverted split ring resonator R20 may be arranged to be spaced apart from each other in a predetermined direction. In the embodiments in FIG. 1 and FIG. 2, the first inverted split ring resonator R10 and the second inverted split ring resonator R20 may be spaced apart from each other in the y-axis direction.

The signal transmission control device 100 may include a conductive line L10 disposed on the dielectric layer 20. The conductive line L10 may extend across the first inverted split ring resonator R10 and the second inverted split ring resonator R20. The conductive line L10 may be disposed on the first and second inverted split ring resonators R10 and R20 to cross the first and second inverted split ring resonators R10 and R20. Accordingly, the conductive line L10 may intersect each of the first inverted split ring resonator R10 and the second inverted split ring resonator R20, and may overlap in the z-axis direction. The conductive line L10 may extend in a direction parallel to the direction in which the first inverted split ring resonator R10 and the second inverted split ring resonator R20 are spaced apart from each other. In the embodiments of FIGS. 1 and 2, the conductive line L10 may extend in the y-axis direction. The conductive line L10 may have a straight line shape at least partially. Furthermore, the conductive line L10 may have a narrower width than that of the first inverted split ring resonator R10 and the second inverted split ring resonator R20.

According to one embodiment, the conductive line L10 may be disposed on the first inverted split ring resonator R10 and the second inverted split ring resonator R20 to cross a central portion of each of the first inverted split ring resonator R10 and the second inverted split ring resonator R20. For example, the conductive line L10 may be disposed within a region defined by a first boundary and a second boundary that are symmetrical with respect to a center line of the first and second ring resonator R10 and R20 extending in the y-direction and spaced apart from each other by equal to or less than 20%, or 10%, or 5% of a length of each of the first and second ring resonators R10 and R20 in the x-direction. Accordingly, the conductive line L10 may intersect the central portion of each of the first inverted split ring resonator R10 and the second inverted split ring resonator R20. Furthermore, the conductive line L10 may overlap the central portion of each of the first inverted split ring resonator R10 and the second inverted split ring resonator R20 in the z-axis direction.

The conductive line L10 may include a metal, or a metallic material, or both. For example, the conductive line L10 may be a metal wire or a metallic material wire. As a non-limiting example, the conductive line L10 may include Cu, but embodiments of the present disclosure are not limited thereto. The conductive line L10 may include at least one of various conductive materials. The conductive line L10 may be electrically insulated from the conductive layer 10. The dielectric layer 20 may be disposed between the conductive line L10 and the conductive layer 10, and the conductive line L10 and the conductive layer 10 may be insulated from each other by the dielectric layer 20. The conductive layer 10 may be grounded. Accordingly, a first surface (e.g., a lower surface) of the conductive layer 10 opposite to a second surface (e.g., an upper surface) thereof on which the dielectric layer 20 is disposed may be a ground plane.

For example, the conductive line L10 may be a transmission line used in the microwave band. The conductive line L10 may be a microstrip line. However, the conductive line L10 is not limited to a microstrip line. Furthermore, for example, the conductive line L10 may have a microscale. For example, the thickness of the conductive line L10 may be microscale. However, in some cases, the conductive line L10 may not have a microscale.

According to an embodiment of the present disclosure, signal transmission characteristics between a first end (or a first end portion) and a second end (or a second end portion) of the conductive line L10 may be controlled by the first inverted split ring resonator R10 and the second inverted split ring resonator R20. The first inverted split ring resonator R10 and the second inverted split ring resonator R20 may be the devices of meta-structure which generate a resonance phenomenon due to the structural characteristics of the conductive layer 10 and the dielectric layer 20. The first inverted split ring resonator R10 and the second inverted split ring resonator R20 may generate a resonance phenomenon due to structural parameters rather than the material itself. If the resonance phenomenon is utilized through changes in structural parameters rather than the properties of the material itself, the degree of freedom in device utilization may be increased in various physical phenomena.

The inverted split ring resonator (ISRR) may have a structure in which a conductor region and a dielectric region are inverted in a split ring resonator SRR. Under the same dimensional conditions and usage conditions, the ISRR may have the same resonance frequency as that of the SRR. However, ISRR may have significantly higher gain and wider bandwidth than SRR. Therefore, when using ISRR, various beneficial effects may be obtained. ISRR may be a type of optical resonator and may have a two-dimensional (planar) structure.

According to one embodiment, an electrical signal may be input to either the first or second end of the conductive line L10. For example, the electrical signal may be an alternating current signal. Electromagnetic waves may be generated in the conductive line L10 due to the electrical signal. A traveling wave of the electromagnetic wave may occur in the conductive line L10. Furthermore, photons corresponding to the quantization state of electromagnetic waves may be generated in the conductive line L10. Each of the first inverted split ring resonator R10 and the second inverted split ring resonator R20 may have a resonance frequency for electromagnetic waves. The first inverted split ring resonator R10 and the second inverted split ring resonator R20 may be physically separated dual photonic resonators.

A signal may be transmitted between the first end and the second end of the conductive line L10, and the signal may be referred to as an 'electrical signal' or an 'electromagnetic wave signal.' Indirect interaction between the first inverted split ring resonator R10 and the second inverted split ring resonator R20 may occur due to traveling wave phase interference. Here, the traveling wave is a traveling wave of the electromagnetic wave and may be generated by the electrical signal.

A signal transmission characteristic through the conductive line L10 may be controlled by indirect interaction between the first inverted split ring resonator R10 and the second inverted split ring resonator R20. The characteristics of the indirect interaction may be adjusted by a distance (spacing) between the first inverted split ring resonator R10 and the second inverted split ring resonator R20. In this regard, one or more of the transmittivity, reflectivity, and absorptivity of signal transmission (signal transfer) between the first end and the second end of the conductive line L10 may be adjusted depending on the distance between the first inverted split ring resonator R10 and the second inverted split ring resonator R20. For example, all of the transmittivity, reflectivity, and absorptivity of signal transmission between the first and second ends of the conductive line L10 may be adjusted according to the distance between the first inverted split ring resonator R10 and the second inverted split ring resonator R20. For example, a distance between the first inverted split ring resonator R10 and the second inverted split ring resonator R20 may be defined as a distance (e.g., "d" in FIG. 2) between a pair of adjacent edges of the first opening pattern A1 of the first inverted ring resonator R10 and the second opening pattern A2 of the second inverted split ring resonator R20.

According to one embodiment, the first inverted split ring resonator R10 and the second inverted split ring resonator R20 may have different resonance frequencies. The first inverted split ring resonator R10 may have a first resonant frequency, and the second inverted split ring resonator R20 may have a second resonance frequency different from the first resonant frequency.

According to one embodiment, the signal transmission control device 100 may have a characteristic corresponding to electromagnetically induced transparency (EIT) in a frequency region (or a frequency range) between the first and second resonance frequencies. The characteristic corresponding to EIT may be referred to as EIT characteristic. Here, the characteristic corresponding to the EIT may be a transmission (signal transmission) characteristic induced by electromagnetic waves. In this regard, the signal transmission control device 100 may have a signal transmission characteristic of about 80% (e.g., from 79.5% to 80.4%) or more or about 90% (e.g., from 89.5% to 90.4%) or more in the frequency region between the first and second resonance frequencies. The characteristic corresponding to the EIT may be generated by a phase reinforcement interference phenomenon of a traveling wave and/or indirect interaction between the first inverted split ring resonator R10 and the second inverted split ring resonator R20.

According to one embodiment, the signal transmission control device 100 may have an asymmetric signal reflection characteristic depending on a signal transmission direction (signal transfer direction) between the first end and the second end of the conductive line L10 in the frequency region between the first resonance frequency and the second resonance frequency. When transmitting a signal from the first end to the second end of the conductive line L10, the signal transmission control device 100 may have a first signal reflection characteristic, and when transmitting a signal from the second end to the first end of the conductive line L10, the signal transmission control device 100 may have a second signal reflection characteristic, and the first signal reflection characteristic and the second signal reflection characteristic may be different from each other. That is, the first signal reflection characteristic and the second signal reflection characteristic may be asymmetric. The frequency or frequency region at which the asymmetric signal reflection characteristic appears may be the same or substantially the same as the frequency or frequency region at which the characteristic corresponding to the EIT appears.

According to one embodiment, when a predetermined condition is satisfied, the signal transmission control device 100 may have a unidirectional reflectionless absorption characteristic. Here, the unidirectional reflectionless absorption characteristic may be defined as a characteristic having signal reflection of about 10% or less and signal absorption of about 90% or more with respect to one direction (unidirection). In some embodiments, the unidirectional reflectionless absorption characteristic may be defined as signal reflection of about 5% or less and signal absorption of about 90% or more with respect to one direction (unidirection). The unidirectional reflectionless absorption characteristic may be a unidirectional reflectionless nearly perfect absorption characteristic (e.g., about 95% or more, about 97% or more, or about 99% or more).

In order to secure electromagnetic wave induced transmission characteristics and unidirectional reflectionless absorption characteristics in existing technologies, a complex resonator design may be required. However, according to an embodiment of the present disclosure, it is possible to easily implement a signal transmission control device having excellent signal control characteristics with a significantly simpler structure as compared to those used in the existing methods. For example, a signal transmission control device according to an embodiment of the present disclosure may have electromagnetic wave induced transmission characteristics and unidirectional reflectionless absorption characteristics. According to an embodiment of the present disclosure, a signal transmission control device which may secure excellent performance even with a relatively simple structure and small size may be implemented. For example, according to an embodiment of the present disclosure, excellent characteristics may be secured by manufacturing a signal transmission control device having a simple structure of ~mm scale. Furthermore, according to an embodiment of the present disclosure, as a non-limiting example, it may be easy to manufacture a signal transmission control device having a pattern width of several tens of nm.

According to one embodiment, an arrangement direction of the first inverted split ring resonator R10 and an arrangement direction of the second inverted split ring resonator R20 may be different from each other. The first inverted split ring resonator R10 and the second inverted split ring resonator R20 may have different resonance frequencies due to these different arrangement directions. For example, the arrangement direction (or orientation) of the first inverted split ring resonator R10 and the arrangement direction (or orientation) of the second inverted split ring resonator R20 may be rotated by about 90° (e.g., from 85° to 94°) with respect to each other. As a specific example, the first inverted split ring resonator R10 may have a gap direction (or a gap orientation) rotated by 90° with respect to one end of the conductive line L10, and the second inverted split ring resonator R20 may have a gap direction rotated by about 180° (e.g., from 175° to) 184° with respect to the one end of the conductive line L10. Referring to FIGS. 1 and 2, the orientation of the first inverted split ring resonator R10 may correspond to a gap orientation of a gap region G1 in the first inverted split ring resonator R10 that is defined by an angle (e.g., about 90°) between a first end (e.g., a left end) of the conductive line L10 and the first gap region G1 of the first inverted split ring resonator R10. The orientation of the second inverted split ring resonator R20 may correspond to a gap orientation of a gap region G2 in the second inverted split ring resonator R20 that is defined by an angle (e.g., about 180°) between the first end (e.g., the left end) of the conductive line L10 and the second gap region G2 of the second inverted split ring resonator R20. Here, the rotation may be clockwise or counterclockwise when observed from the front side of the signal transmission control device 100. However, the arrangement directions of the first inverted split ring resonator R10 and the second inverted split ring resonator R20 are not limited to the above descriptions and may vary depending on the case.

According to one embodiment, the first inverted split ring resonator R10 may have a first gap region G1, and the second inverted split ring resonator R20 may have a second gap region G2. The direction in which the first gap region G1 is disposed in the first inverted split ring resonator R10 may correspond to the gap direction of the first inverted split ring resonator R10. Similarly, the direction in which the second gap region G2 is disposed in the second inverted split ring resonator R20 may correspond to the gap direction of the second inverted split ring resonator R20. The first gap region G1 and the second gap region G2 may be arranged in different directions.

According to one embodiment, the first inverted split ring resonator R10 and the second inverted split ring resonator R20 may have substantially the same size, but are not limited thereto, and in some cases, they R10, R20 may have different sizes.

In FIG. 2, the dimensions of each part of the signal transmission control device 100 and the distance between components are indicated in alphabet letters. 'a' represents an outer length (e.g., an outer diameter) of each of the first inverted split ring resonator R10 and the second inverted split ring resonator R20, 'b' represents an inner length (e.g., an inner diameter) of each of the first inverted split ring resonator R10 and the second inverted split ring resonator R20, and 'd' represents a distance of the first inverted split ring resonator R10 and the second inverted split ring resonator R20, 'g' represents a gap width of each of the first inverted split ring resonator R10 and the second inverted split ring resonator R20, and 'w' represents a width of the conductive line L10.

As a non-limiting example, 'a' may be about 1 mm or more, 'b' may be about 0.5 mm or more, 'd' may be about 0.2 mm to about 100 mm or about 0.2 mm to about 50 mm, 'g' may be about 0.01 mm or more, 'w' may be about 0.01 mm or more. Furthermore, as a non-limiting example, the thickness of the conductive line L10 (hereinafter, denoted by $t_c$), may be about 0.1 μm or more, the thickness of the dielectric layer 20 (hereinafter, denoted by $t_d$), may be about 0.01 mm or more, and the dielectric constant of the dielectric layer 20 (hereinafter, denoted by $\varepsilon_r$), may be about 1 or more. For example, each of the thickness $t_c$ of the conductive line L10 and the thickness $t_d$ of the dielectric constant of the dielectric layer 20 may be a length in the z-direction of FIG. 1.

As a non-limiting example, in the signal transmission control device 100, 'a' may be about 5 mm, 'b' may be about 3.8 mm, 'd' may be about 9~20 mm, 'g' may be about 0.4 mm, 'w' may be about 0.55 mm, $t_c$ may be about 35 μm, $t_d$ may be about 0.64 mm, and $\varepsilon_r$ may be about 10. The signal transmission control device 100 may be manufactured under these conditions and its characteristics may be evaluated as an example. However, the specific conditions described above are merely illustrative and may vary according to embodiments.

Figure 3:
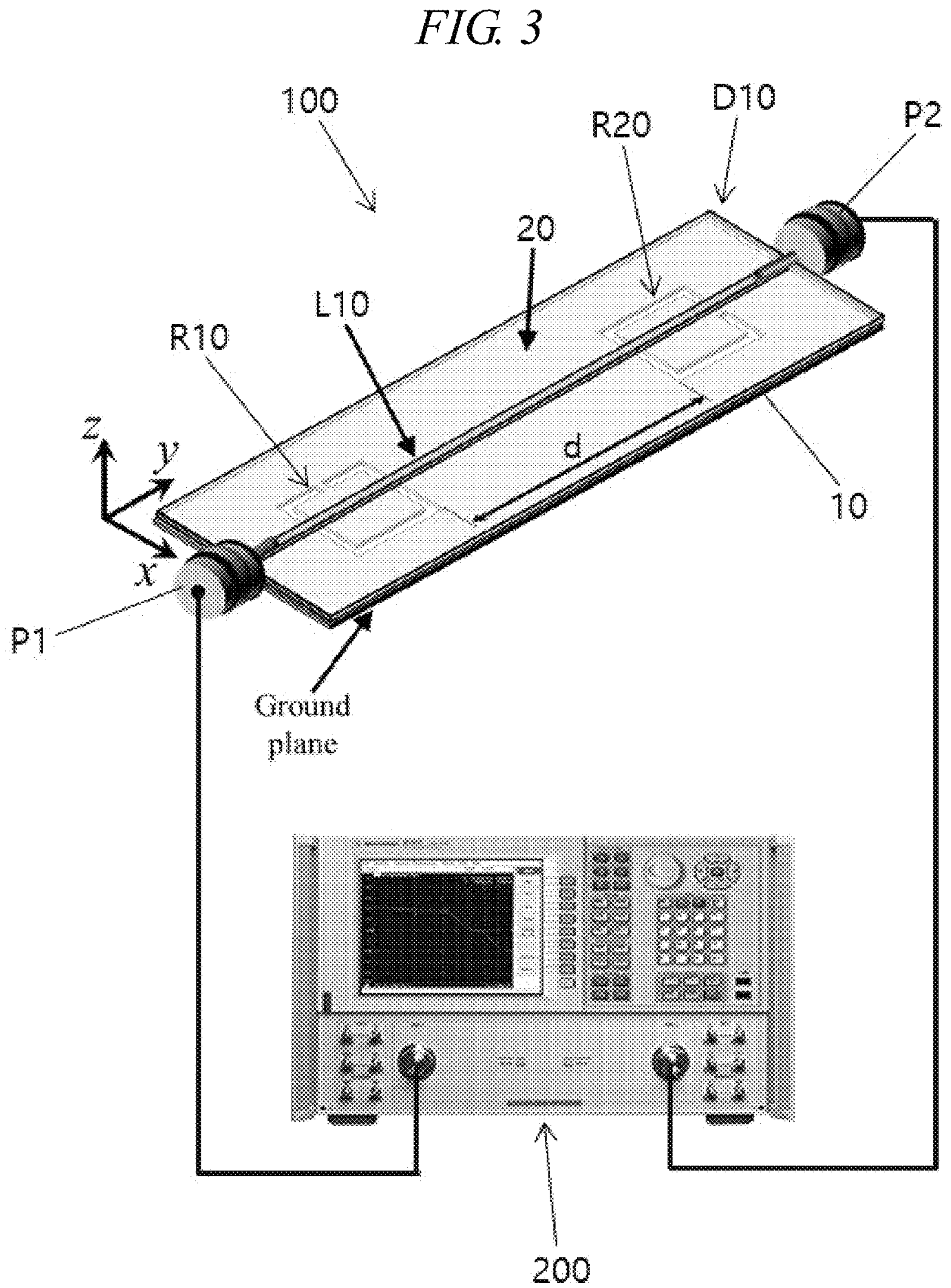
FIG. 3 is a diagram illustrating a method (experiment method) measuring signal transmission by using a signal transmission control element according to an embodiment of the present disclosure.

FIG. 3 is a diagram illustrating a method measuring signal transmission by using the signal transmission control device 100 according to an embodiment of the present disclosure.

Referring to FIG. 3, the signal transmission control device 100 according to an embodiment of the present disclosure may include the structure described in FIGS. 1 and 2. A first port P1 connected to the first end of the conductive line L10 may be provided, and a second port P2 connected to the second end of the conductive line L10 may be provided. The first port P1 and the second port P2 may be referred to as a first terminal and a second terminal, respectively. The first port P1 and the second port P2 may be connected to a vector network analyzer (VNA) 200. Accordingly, the VNA 200 may be connected to both ends of the conductive line L10 of the signal transmission control device 100. An electrical signal may be input to any one of the first port P1 and the second port P2 by using the VNA 200, and signal transmission due to the input electrical signal may be measured and analyzed.

Figure 4A:
FIGS. 4A, 4B and 4C are graphs illustrating a scattering transmission spectrum experimentally measured by using a signal transmission control device according to an embodiment of the present disclosure.
Figure 4A:
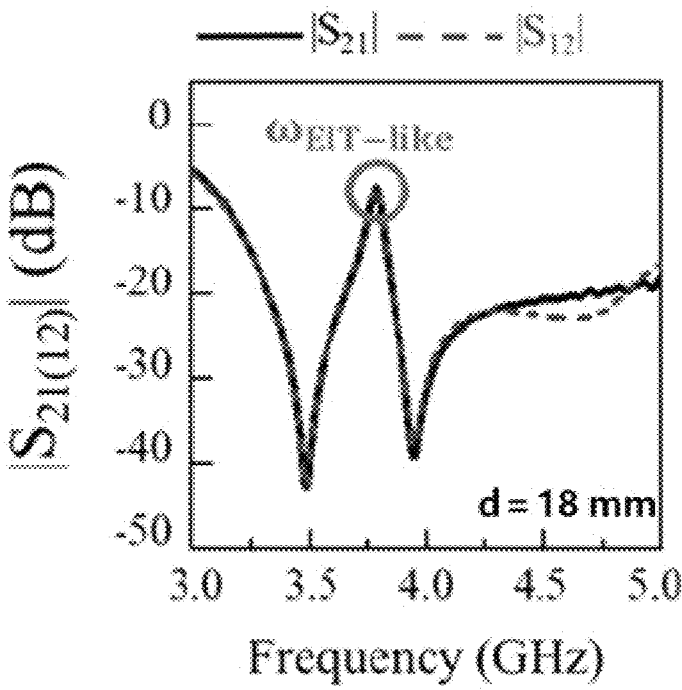
Figure 4B:
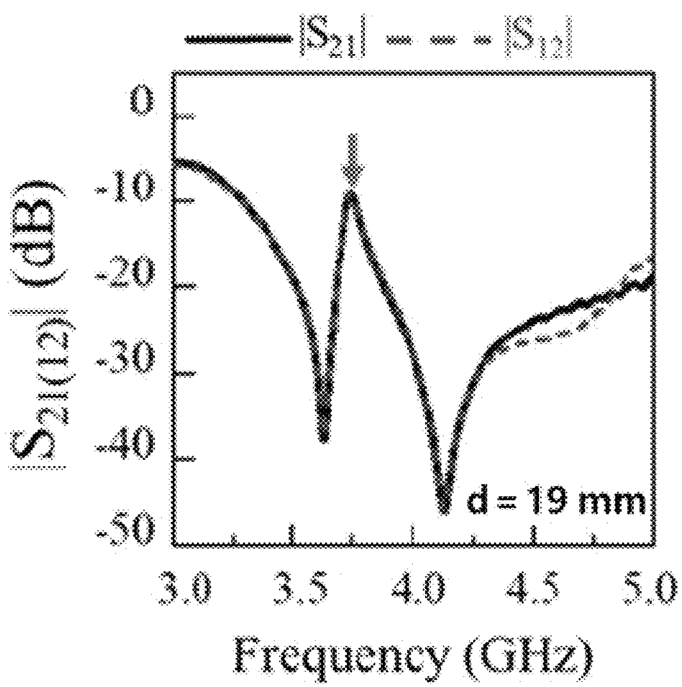
Figure 4C:
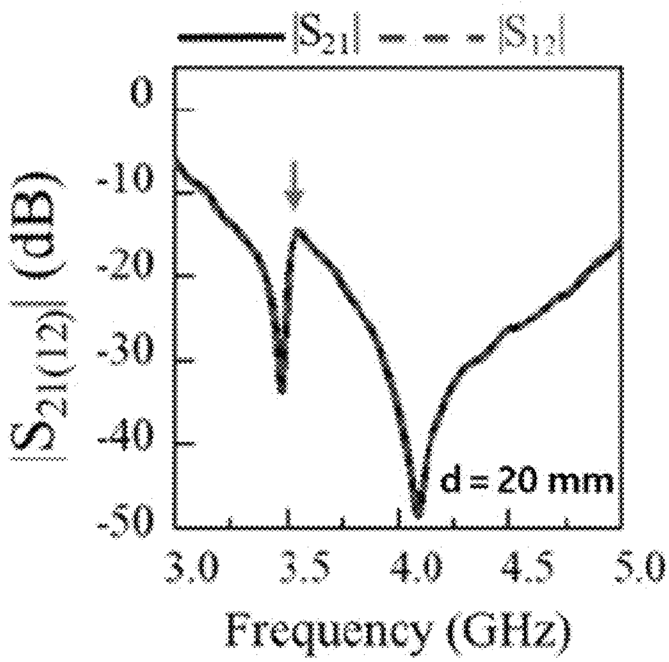

FIGS. 4A, 4B, and 4C each illustrate a scattering transmission spectrum experimentally measured by using a signal transmission control device according to an embodiment of the present disclosure. That is, FIGS. 4A, 4B, and 4C show experimentally measured scattering transmission spectra of the alternating current (AC) current frequency versus $|S_{21}|$ and $|S_{12}|$ for device samples having different distances (d) between two ISRRs. Here, graph in FIG. 4A corresponds to a case for d=18 mm, graph in FIG. 4B corresponds to a case for d=19 mm, and graph in FIG. 4C corresponds to a case for d=20 mm. $|S_{21}|$ represents the transmission characteristics of the signal transmitted from the first port (P1 in FIG. 3) to the second port (P2 in FIG. 3), and $|S_{12}|$ represents the transmission characteristics of the signal transmitted from the second port P2 to the first port P1.

Referring to FIGS. 4A-4C, it may be confirmed that a characteristic corresponding to electromagnetically induced transparency (EIT) appear in a frequency region between the first resonance frequency of the first inverted split ring resonator (ISRR) (R10 in FIG. 3) and the second resonance frequency of the second inverted split ring resonator (ISRR) (R20 in FIG. 3). Here, the characteristic corresponding to the EIT may be a transmission (signal transmission) characteristic induced by electromagnetic waves. In this regard, the signal transmission control device (100 in FIG. 3) may have a signal transmission characteristic of about 80% or more or about 90% or more in the frequency region between the first resonance frequency and the second resonance frequency. A transmission peak close to 0 dB (indicative of complete transmission of the signal) may be observed in the frequency region between the first and second resonance frequencies. The characteristic corresponding to the EIT may be generated by phase reinforcement interference phenomenon of a traveling wave and/or indirect interaction between the first inverted split ring resonator (ISRR) R10 and the second inverted split ring resonator (ISRR) R20. In FIGS. 4A-4C, the arrows indicate peaks similar to or corresponding to EIT.

Figure 5A:
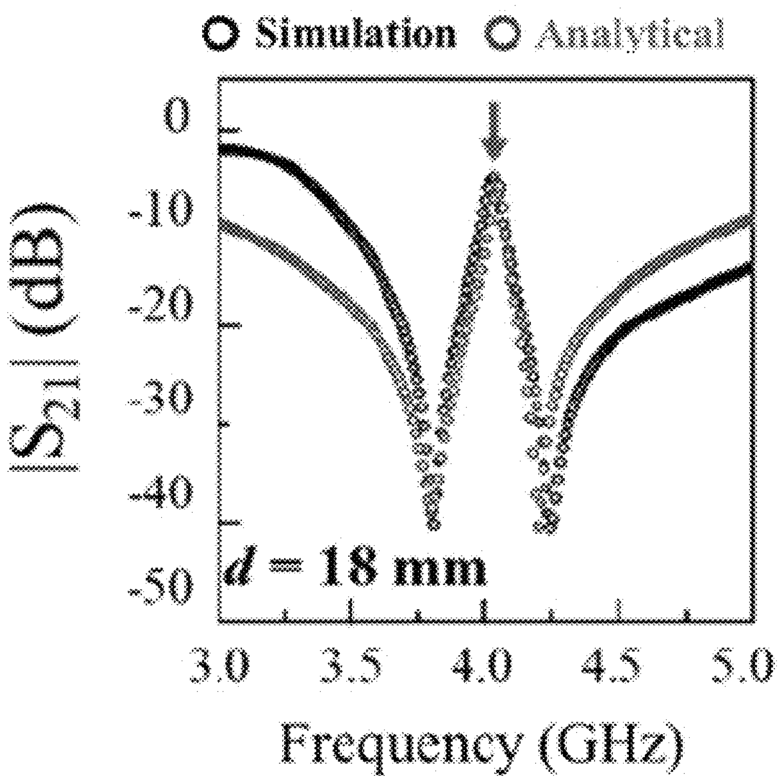
FIGS. 5A, 5B and 5C are graphs illustrating a scattering transmission spectrum based on simulation results by CST (computer simulation technology) and the numerical calculation of the analytical model, according to an embodiment of the present disclosure.
Figure 5B:
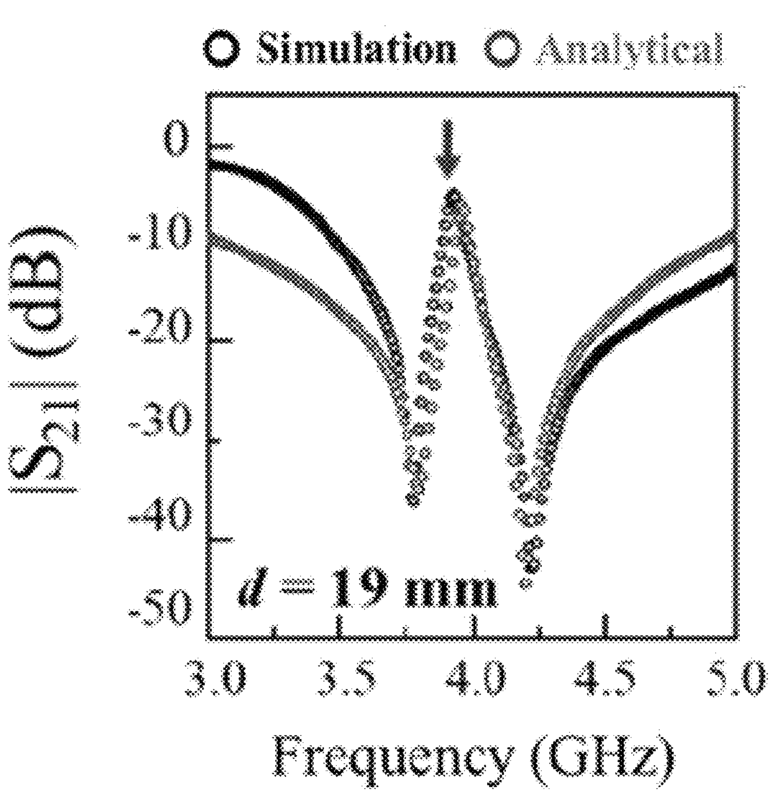
Figure 5C:
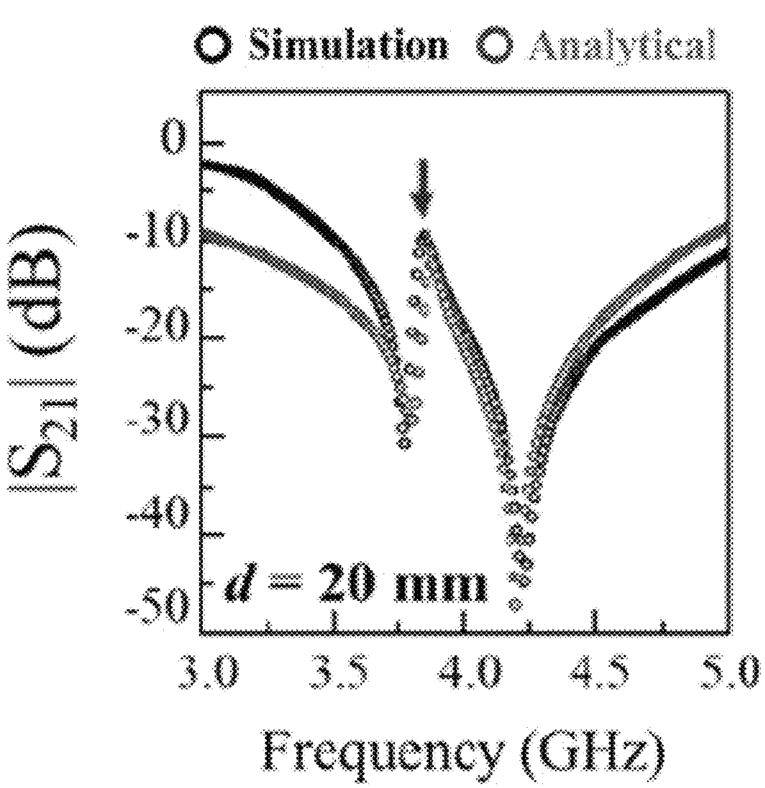

FIGS. 5A, 5B, and 5C each illustrate a scattering transmission spectrum based on simulation results by CST (computer simulation technology) and the numerical calculation of the analytical model. Graph in FIG. 5A corresponds to a case for d=18 mm, graph in FIG. 5B corresponds to a case for d=19 mm, and graph in FIG. 5C corresponds to a case for d=20 mm. $|S_{21}|$ represents the transmission characteristics of the signal transmitted from the first port (P1 in FIG. 3) to the second port (P2 in FIG. 3).

Referring to FIGS. 5A-5C, it may be confirmed that the results similar to the experimental results of FIGS. 4A-4C are derived. The electromagnetic wave-induced transmission phenomenon implemented in the experiment was verified through the simulation and the theoretical model. In FIGS. 5A-5C, the arrows indicate peaks similar to or corresponding to EIT.

Figure 6A:
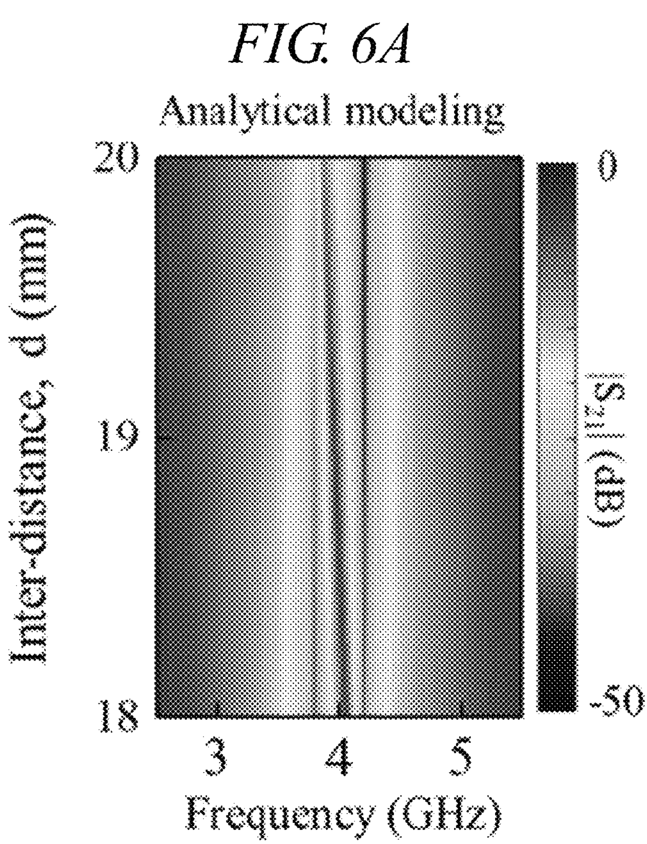
FIGS. 6A and 6B are graphs illustrating the change in signal transmission characteristics according to the distance (d) between two ISRRs by model calculation and CST simulation for a signal transmission control element according to an embodiment of the present disclosure.
Figure 6B:
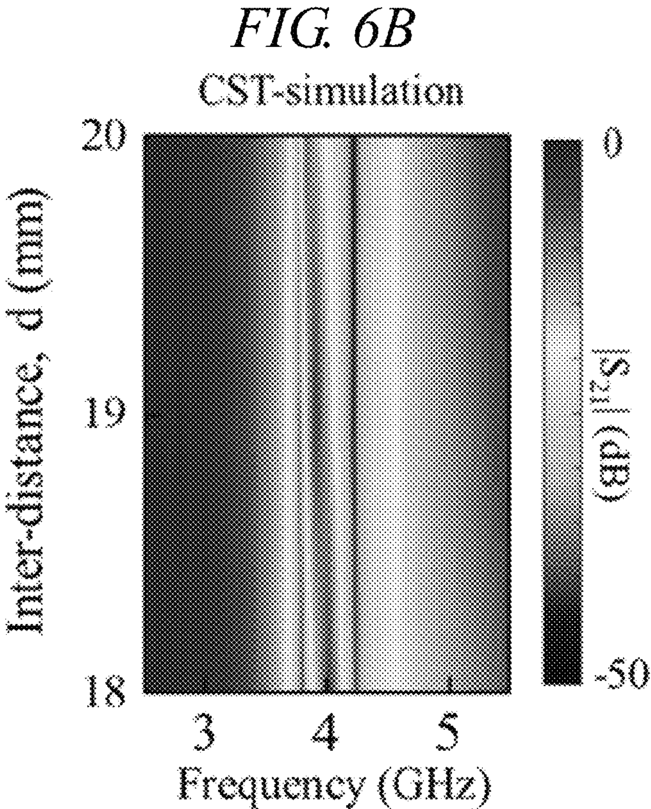

FIGS. 6A and 6B illustrate changes in signal transmission characteristics according to the distance (d) between two ISRRs based on model calculation and CST simulation, respectively, for a signal transmission control device according to an embodiment of the present disclosure. Model calculations and CST simulations were performed in the range d=18~20 mm with a step of 0.2 mm.

Referring to FIGS. 6A and 6B, the results of the calculation using the theoretical model (A) and the results of the CST simulation (B) are generally similar.

Figure 7:
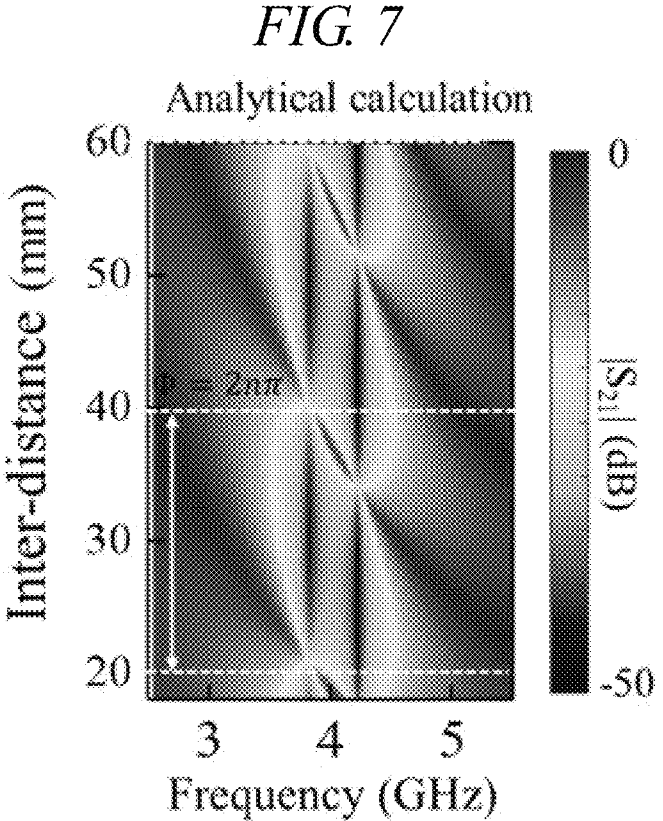
FIG. 7 is a graph illustrating the change in signal transmission characteristics according to the distance (d) between two ISRRs based on model calculation for a signal transmission control element according to an embodiment of the present disclosure.

FIG. 7 illustrate changes in signal transmission characteristics according to the distance (d) between two ISRRs based on model calculation for a signal transmission control device according to an embodiment of the present disclosure. Model calculations were performed in the range d=18~60 mm with steps of 0.2 mm.

Referring to FIG. 7, when the inter-distance (i.e., d) is expanded using a theoretical model, the transmission characteristics appear periodically at every given distance (e.g., about 20 mm). In other words, one or more transmission characteristics of the signal transmission control device may be repeated at multiples (e.g., about 40 mm, about 60 mm, etc.) of the given distance. For example, such a distance (e.g., about ~20 mm) may correspond to a specific inter-distance (or specific mutual distance), through which distance scalability may be suggested.

Figure 8A:
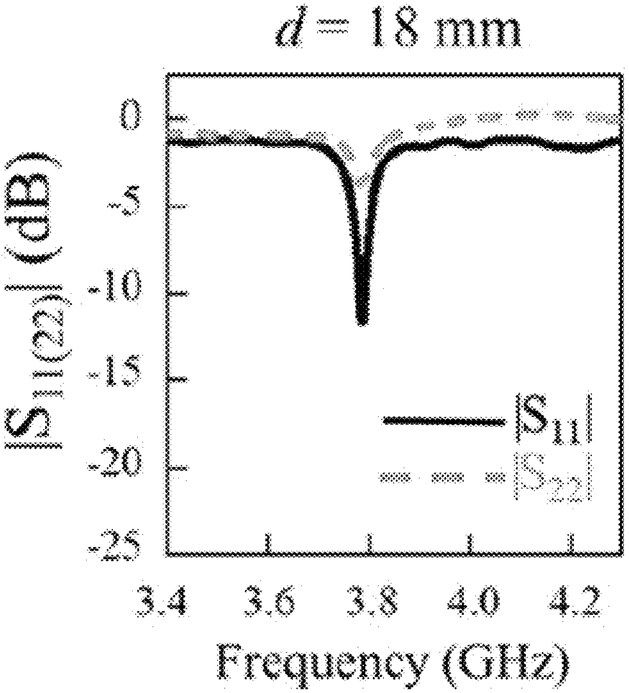
FIGS. 8A, 8B and 8C are graphs illustrating a reflection spectrum experimentally measured by using a signal transmission control element according to an embodiment of the present disclosure.
Figure 8B:
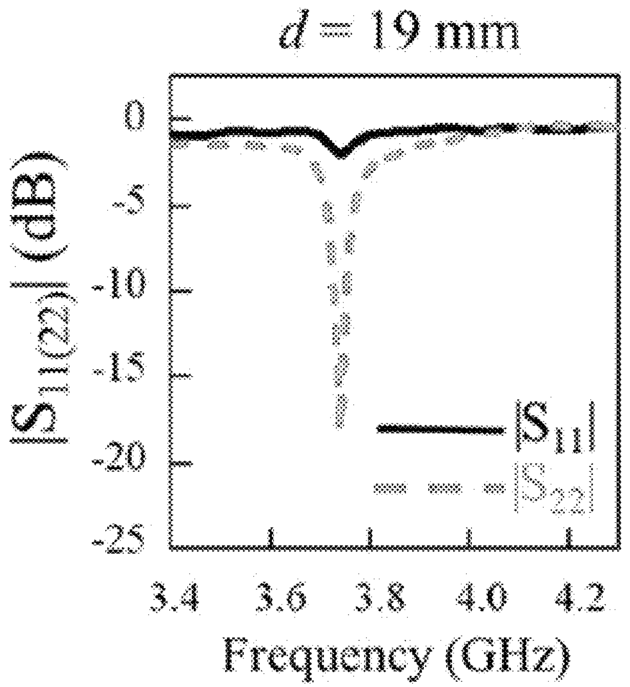
Figure 8C:
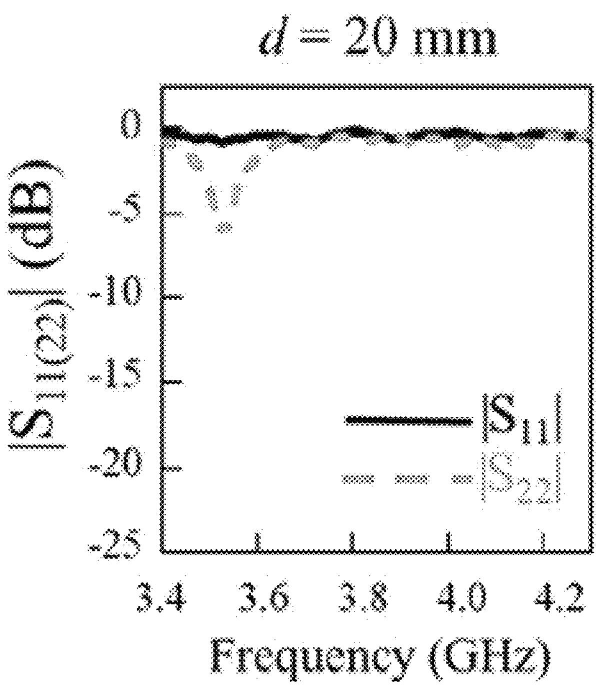

FIGS. 8A, 8B, and 8C each illustrate a reflection spectrum experimentally measured by using a signal transmission control device according to an embodiment of the present disclosure. That is, FIGS. 8A, 8B, and 8C show the experimentally measured reflection spectra of the alternating current (AC) current frequency versus $|S_{11}|$ and $|S_{22}|$ for device samples having different distances (d) between two ISRRs. Here, graph in FIG. 8A corresponds to a case for d=18 mm, graph in FIG. 8B corresponds to a case for d=19 mm, and graph in FIG. 8C corresponds to a case for d=20 mm. $|S_{11}|$ represents the characteristics of the signal reflected to the first port (P1 in FIG. 3) after being input to the first port P1, and $|S_{22}|$ represents the characteristics of the signal reflected to the second port (P2 in FIG. 3) after being input to the second port P2.

Referring to FIGS. 8A-8C, the signal transmission control device according to an embodiment of the present disclosure may exhibit an asymmetric reflection characteristic depending on the reflection direction at the same (or substantially the same) frequency as the electromagnetic wave-induced transmission peak described in FIGS. 4A-4C. The signal transmission control device may exhibit has asymmetric signal reflection characteristics depending on the signal transmission direction (signal transfer direction) between the first end and second end of the conductive line (L10 in FIG. 3) in a frequency region between a first resonance frequency of the first inverted split ring resonator (ISRR) (R10 in FIG. 3) and a second resonance frequency of the second inverted split ring resonator (ISRR) (R20 in FIG. 3). For example, in the peak area of graph in FIG. 8A, the reflection characteristic corresponding to $|S_{11}|$ and the reflection characteristic corresponding to $|S_{22}|$ may be different from each other and may be mutually asymmetrical. The frequency or frequency region at which the asymmetric signal reflection characteristic appears in FIGS. 8A-8C may be the same or substantially the same as the frequency or frequency region at which the characteristic corresponding to the EIT characteristic in FIGS. 4A-4C appears, respectively.

Figure 9:
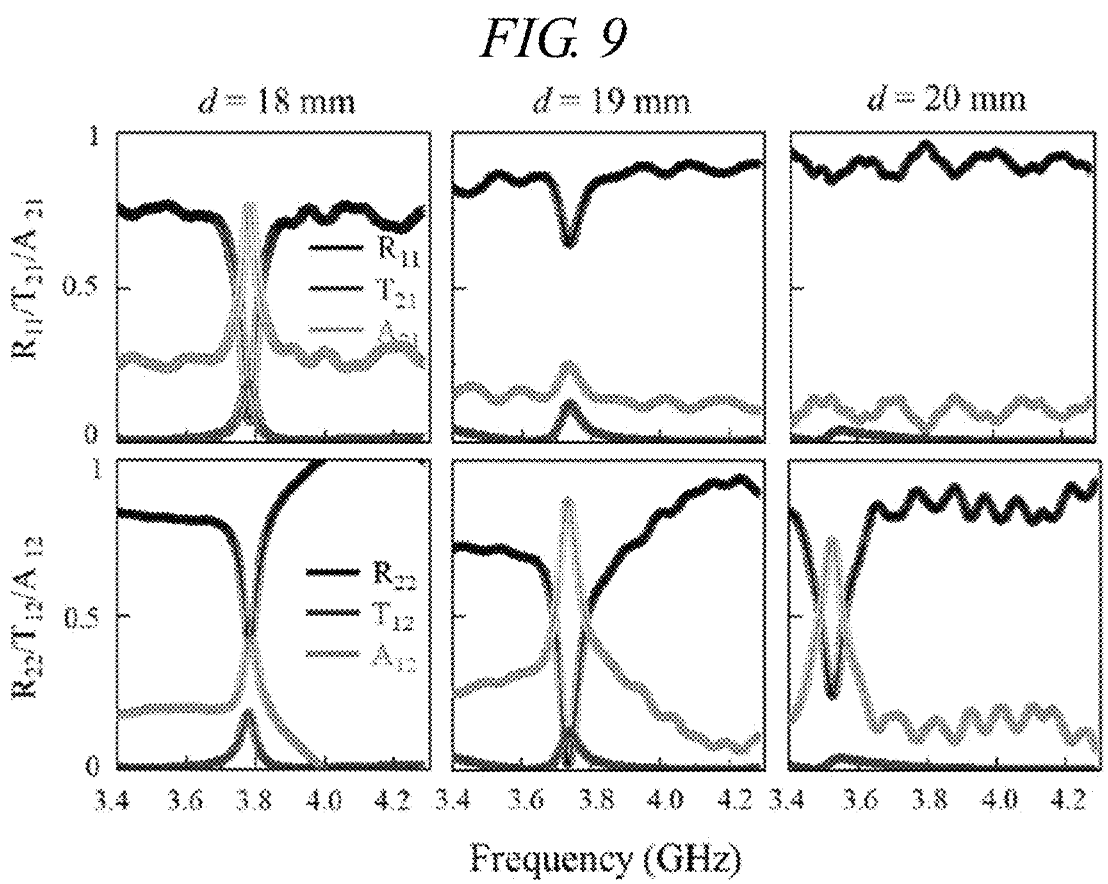
FIG. 9 is a graph illustrating the reflectivity ($R_{11}$, $R_{22}$), transmittivity ($T_{21}$, $T_{12}$) and absorptivity ($A_{21}$, $A_{12}$) of the signal according to the distance (d) between two ISRRs of a signal transmission control element according to an embodiment of the present disclosure.

FIG. 9 illustrate the reflectivity ($R_{11}$, $R_{22}$), transmittivity ($T_{21}$, $T_{12}$) and absorptivity ($A_{21}$, $A_{12}$) of the signal according to the distance (d) between two ISRRs of a signal transmission control device according to an embodiment of the present disclosure. The results in FIG. 9 may be results calculated from experimental data. Here, the reflectivity ($R_{11}$, $R_{22}$), transmittivity ($T_{21}$, $T_{12}$) and absorptivity ($A_{21}$, $A_{12}$) may be defined as follows: $R_{11}=|S_{11}|^2$, $R_{22}=|S_{22}|^2$, $T_{21}=|S_{21}|^2$, $T_{12}=|S_{12}/^2$, $A_{21}=1-R_{11}-T_{21}$, and $A_{12}=1-R_{22}-T_{12}$.

According to an embodiment of the present disclosure, the characteristics described with reference to FIGS. 4A-4C, 8A-8C, and 9 may be obtained by using a simple structure. That is, the characteristics corresponding to the EIT may be obtained by using a simple structure, and in addition, asymmetric signal reflection characteristics may be obtained depending on the signal transmission direction.

Figure 10:
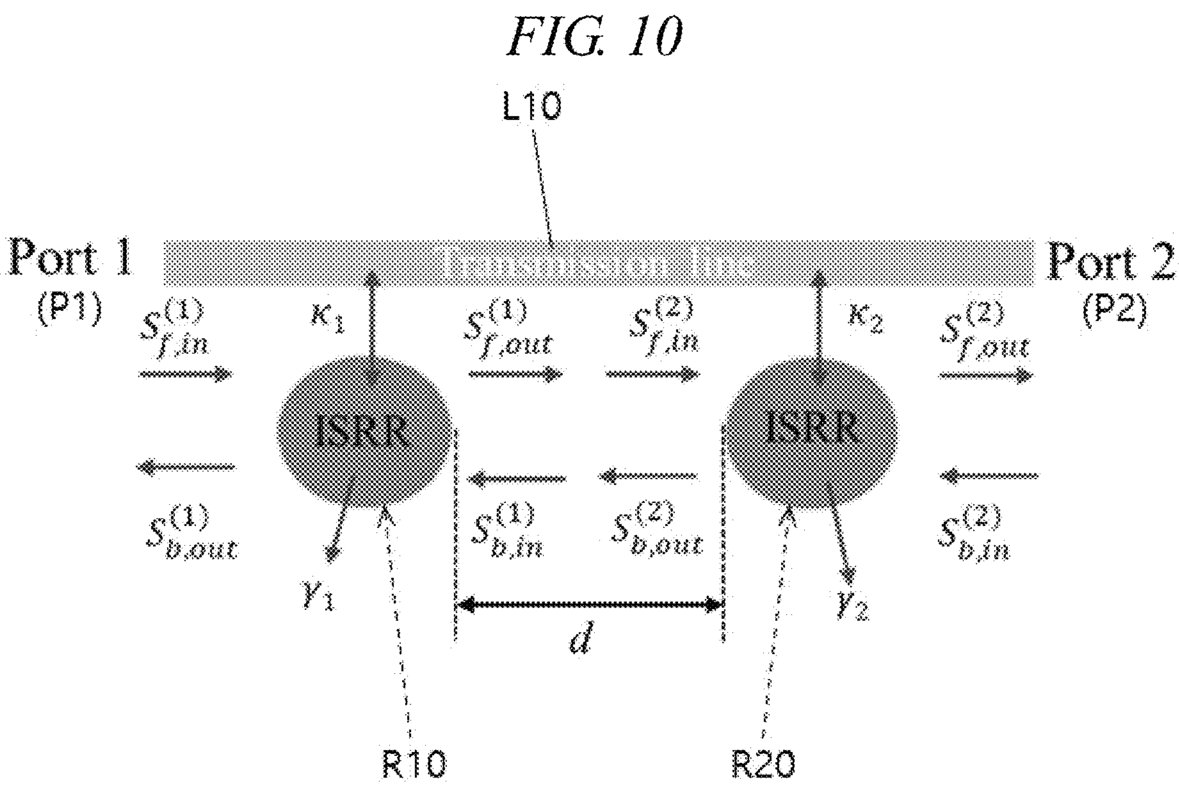
FIG. 10 is a schematic diagram of an analytical model of a double ISRR dissipatively coupled to a conductive line according to an embodiment of the present disclosure.

FIG. 10 is a schematic diagram of an analytical model of a double ISRR R10 and R20 dissipatively coupled to a conductive line L10 according to an embodiment of the present disclosure. Here, the separation distance between the two ISRRs R10, R20, that is, the inter-distance (d), may be changed according to embodiments.

In FIGS. 10, $\kappa_1$ and $\kappa_2$ represent resonance attenuation constants of the first and second ISRRs R10 and R20 toward the conductive line L10, respectively. γ1 and γ2 represent resonance attenuation constants (internal resonance attenuation constants) of the first and second ISRRs R10 and R20 toward inside, respectively. $\gamma_1$ and $\gamma_2$ may be terms which depend on the intrinsic properties of the resonator. The amplitudes of the waves entering and leaving the common conductive line L10 are denoted by $$S^{(i)}_{f(b),in} \text{ and } S^{(i)}_{f(b),out}$$

(i=1, 2), respectively. Here, the subscripts f and b represent forward and reverse propagating wave modes, respectively. Furthermore, the subscripts in and out indicate input and output for each of ISRRs R10 and R20, respectively. Superscripts (1) and (2) indicate the first and second ISRRs R10 and R20, respectively.

The scattering parameter (S-parameter) which may be applied to the signal transmission control device according to an embodiment of the present disclosure may be defined by Equations 1 to 4 as follows:

$$S_{11} = \frac{r_1 + r_2 t_1 e^{2i\varphi_1} + r_1 r_2 e^{2i\varphi_1}}{1 - r_1 r_2 e^{2i\varphi_1}}; \quad \text{[Equation 1]}$$

$$S_{12} = \frac{t_1 t_2 e^{i\varphi_1}}{1 - r_1 r_2 e^{2i\varphi_1}}; \quad \text{[Equation 2]}$$

$$S_{21} = \frac{t_1 t_2 e^{i\varphi_1}}{1 - r_1 r_2 e^{2i\varphi_1}}; \text{ and} \quad \text{[Equation 3]}$$

$$S_{22} = \frac{r_2 + r_1 t_2 e^{2i\varphi_1} + r_1 r_2 e^{2i\varphi_1}}{1 - r_1 r_2 e^{2i\varphi_1}}. \quad \text{[Equation 4]}$$

In the above Equations 1 to 4, $r_1$ and $r_2$ represent the complex reflection coefficients for the first and second ISRRs R10 and R20, respectively, and $t_1$ and $t_2$ represent the complex transmission coefficients for the first and second ISRRs R10 and R20, respectively, and ϕ represents the phase difference for the interval between the first and second ISRRs R10 and R20. Meanwhile, the fitting parameters may be set as follows: γ1=0.149 GHZ, γ2=0.073 GHZ, $\kappa_1$=6.45 GHZ, and $\kappa_2$=5.236 GHz. Furthermore, ϕ may be defined as Equation 5 below.

$$\varphi = (\omega/c_{eff})d \quad \text{[Equation 5]}$$

In Equation 5, ω represents the frequency of the signal, $c_{eff}$ represents the effective speed of light, and d represents the distance between two ISRRs R10 and R20.

In Equation 5, $c_{eff}$ may be defined as Equation 6 below.

$$c_{eff} = c/\sqrt{\epsilon_{eff}} \quad \text{[Equation 6]}$$

In Equation 6, c represents the speed of light, and $\epsilon_{eff}$ represents the effective dielectric constant of the dielectric.

The reflectivity ($R_{11}$, $R_{22}$), transmittivity ($T_{21}$, $T_{12}$), and absorptivity ($A_{21}$, $A_{12}$) of the signal of the signal transmission control device according to an embodiment of the present disclosure may be defined as $R_{11}=|S_{11}|^2$, $R_{22}=|S_{22}|^2$, $T_{21}=|S_{21}|^2$, $T_{12}=|S_{12}|^2$, $A_{21}=1-R_{11}-T_{21}$, and $A_{12}=1-R_{22}-T_{12}$.

Figure 11:
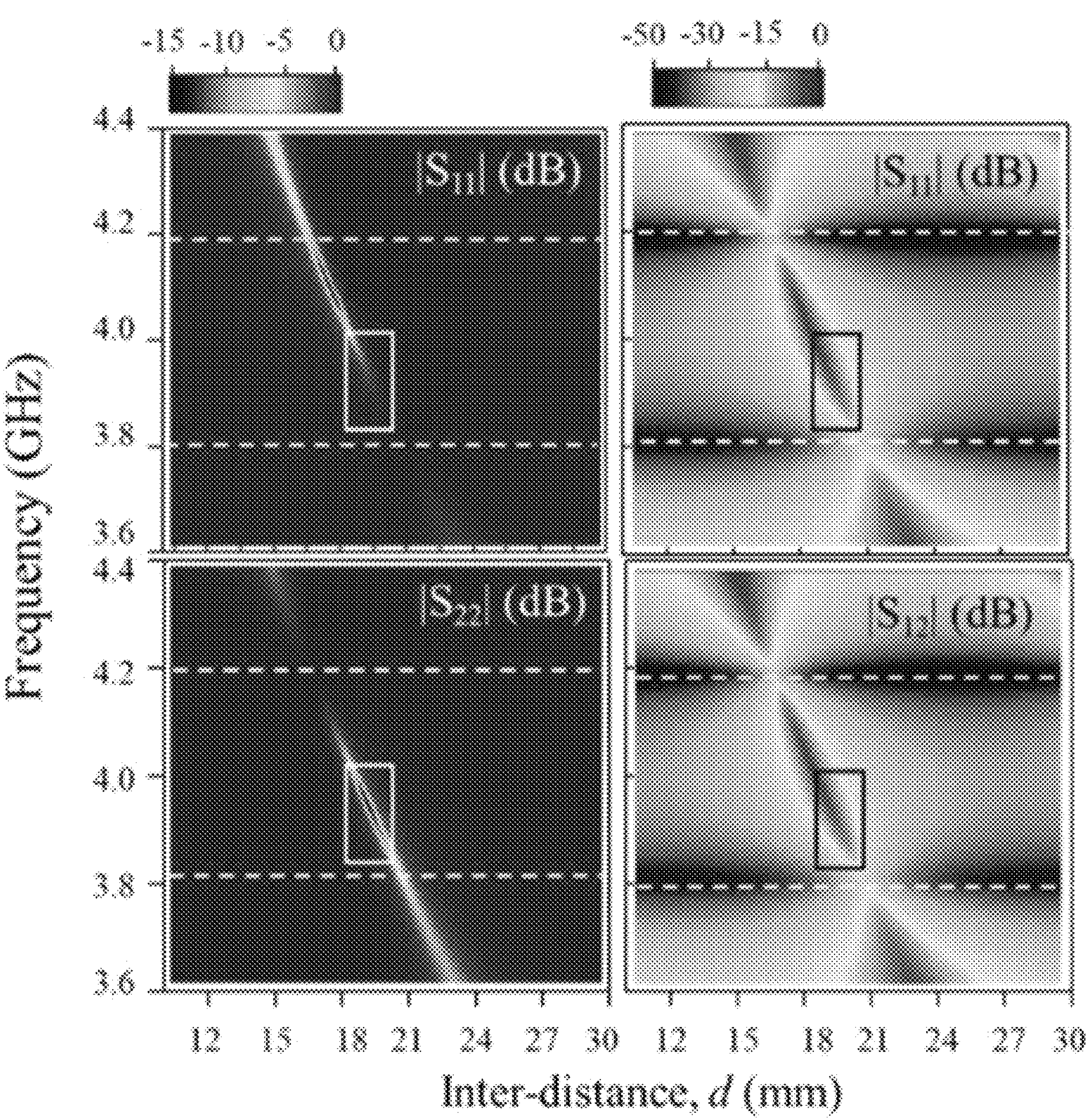
FIG. 11 is a diagram illustrating contour plots of analytical calculations of $|S_{11}|$ and $|S_{22}|$ reflection spectra and $|S_{11}|$ and $|S_{22}|$ transmission spectra on the d-f plane ranging from d=10 to 30 mm and f (frequency)=3.6 to 4.4 GHz for a signal transmission control element according to an embodiment of the present disclosure.

FIG. 11 is a diagram illustrating contour plots of analytical calculations of $|S_{11}|$ and $|S_{22}|$ reflection spectra and $|S_{11}|$ and $|S_{22}|$ transmission spectra on the d-f plane ranging from d=10 to 30 mm and f (frequency)=3.6 to 4.4 GHz for a signal transmission control device according to an embodiment of the present disclosure.

Figure 12:
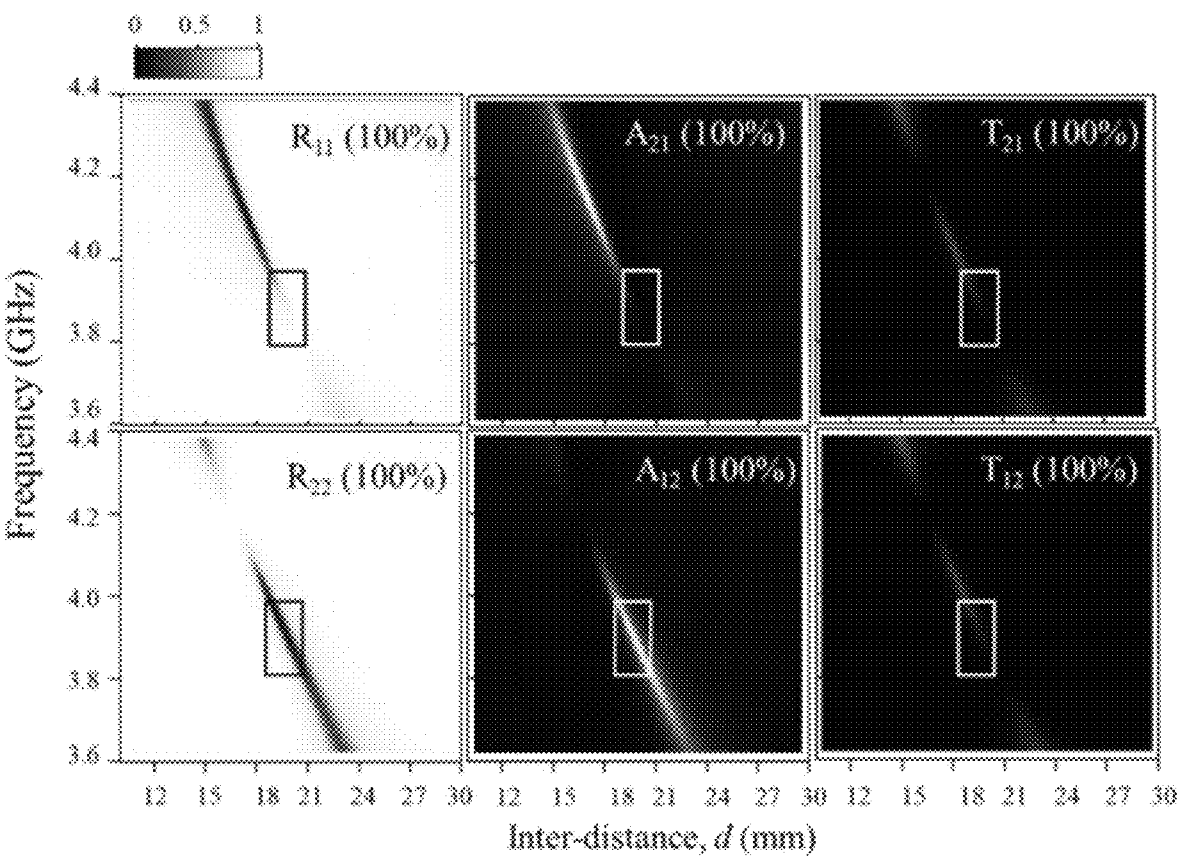
FIG. 12 is a diagram illustrating reflectivity ($R_{11}$, $R_{22}$), absorptivity ($A_{21}$, $A_{12}$), and transmittivity ($T_{21}$, $T_{12}$) corresponding to the results of FIG. 11.

FIG. 12 is a diagram illustrating reflectivity ($R_{11}$, $R_{22}$), absorptivity ($A_{21}$, $A_{12}$), and transmittivity ($T_{21}$, $T_{12}$) corresponding to the results of FIG. 11. The marked rectangular boxes represent data in the range f=3.85 to 4.0 GHz and d=18 to 20 mm. For analytical calculations, the parameters such as $\gamma_1=0.15$ GHZ, $\gamma_2=0.073$ GHZ, $\kappa_1=6.45$ GHZ, and $\kappa_2=5.24$ GHz were used along with the corresponding retardation phases.

Referring to FIG. 11 and FIG. 12, unidirectional reflectionless absorption may exist, similar to the behavior of the scattering coefficient. In particular, the absorptivity may reach almost 100% in one direction. This indicates that a unidirectional signal transmission device (signal transmission control device) can be implemented as a signal transmission control device according to an embodiment of the present disclosure.

Figure 13A:
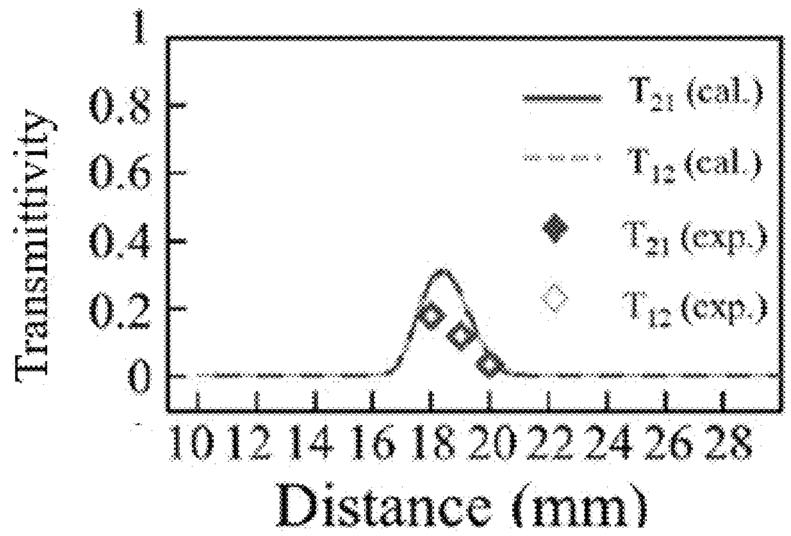
FIGS. 13A, 13B, 13C and 13D are graphs illustrating the results of analytical calculations of transmittivity ($T_{21}$, $T_{12}$), reflectivity ($R_{11}$, $R_{22}$) and absorptivity ($A_{21}$, $A_{12}$) as a function of inter-distance (d) by comparing experimental data points (symbols) for the case where the inter-distance (d) between two ISRRs is 18, 19, and 20 mm for a signal transmission control element according to an embodiment of the present disclosure.
Figure 13B:
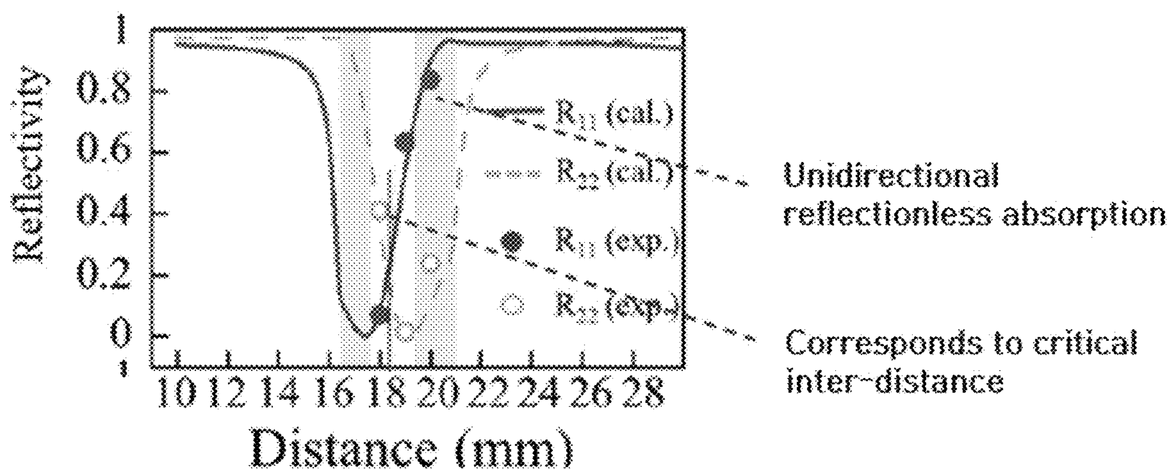
Figure 13C:
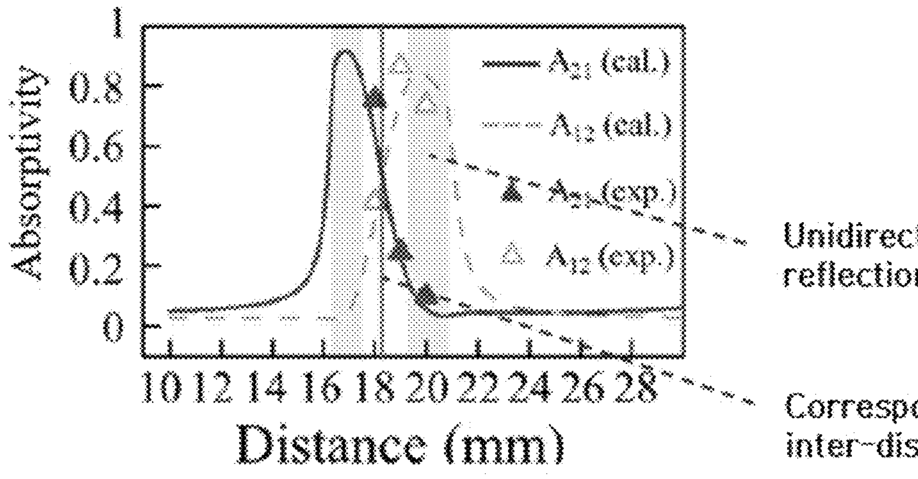
Figure 13D:
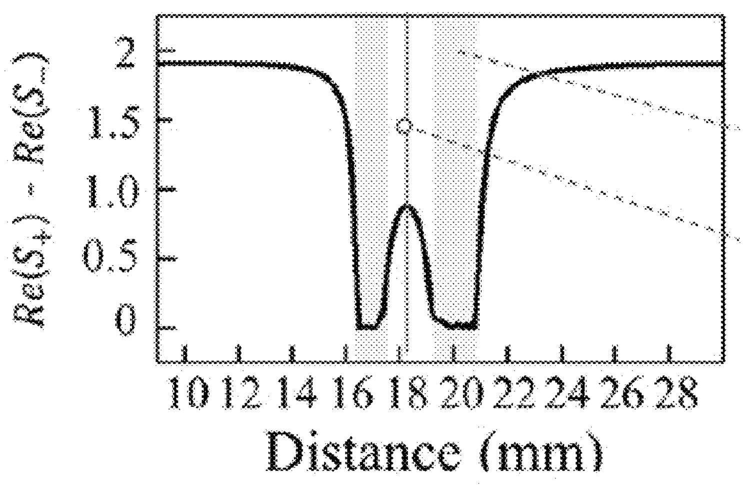

FIGS. 13A, 13B, 13C, and 13D each illustrate results of analytical calculations of transmittivity ($T_{21}$, $T_{12}$), reflectivity ($R_{11}$, $R_{22}$) and absorptivity ($A_{21}$, $A_{12}$) as a function of inter-distance (d) by comparing experimental data points (symbols) for the case where the inter-distance (d) between two ISRRs is 18, 19, and 20 mm for a signal transmission control device, according to an embodiment of the present disclosure. Graph in FIG. 13A shows the results for the transmittivity ($T_{21}$, $T_{12}$), graph in FIG. 13B shows the results for the reflectivity ($R_{11}$, $R_{22}$), and graph in FIG. 13C shows the results for the absorptivity ($A_{21}$, $A_{12}$). In addition, graph in FIG. 13D shows the difference between the upper ($S_+$) value and the lower ($S_-$) value of the real part of the eigenvalues of the scattering matrix S. The results in the graph of FIG. 13D are calculated for various d values ranging from 9 to 30 mm at 0.1 mm intervals.

Referring to FIGS. 13A-13D, vertical gray color may indicate areas where unidirectional reflectionless absorption occurs. In some embodiments, the inter-distance (d) between two ISRRs may be adjusted to make the signal transmission control device have a unidirectional reflectionless absorption characteristic. The portion indicated by the vertical solid line may correspond to a critical inter-distance where the transmission (reflection) magnitudes, for example, the transmittivity ($T_{21}$, $T_{12}$), the reflectivity ($R_{11}$, $R_{22}$), and the absorptivity ($A_{21}$, $A_{12}$) are the same for both directions (e.g., a first direction from the first end of the conductive line L10 to the second end of the conductive line L10, and a second direction opposite to the first direction).

The scattering matrix S and the upper ($S_+$) value and the lower ($S_-$) value described in FIG. 13D may be defined as Equations 7 and 8 below.

$$S=\begin{pmatrix} t & r_b \\ r_f & t \end{pmatrix} \quad \text{[Equation 7]}$$

$$S_{\pm}=t\pm\sqrt{r_f r_b} \quad \text{[Equation 8]}$$

The scattering matrix of Equation 7 may be a non-Hermitian scattering matrix. In equations 7 and 8, t represents the complex transmission coefficient, $r_f$ represents the complex reflection coefficient in the forward direction, and $r_b$ represents the complex reflection coefficient in the reverse direction. The unidirection reflectionless condition may be defined as follows: $r_f=0$, $r_b\neq0$ or $r_f\neq0$, $r_b=0$.

From the results in FIGS. 13A-13D, it may be confirmed that the actual experimental results are in good agreement with the theoretical model and simulation results. The electromagnetic wave-induced transmission characteristics and unidirectional reflectionless absorption characteristics may be obtained by adjusting the inter-distance (mutual distance) between two ISRRs. This may be an important design parameter in a signal transmission control device and may be usefully utilized in designing a signal transmission control device.

According to another embodiment of the present disclosure, various electronic devices including signal transmission control devices according to an embodiment of the present disclosure may be provided. For example, the electronic device may include a switch, a modulator, a sensor, a microwave circuit, an information device, etc. The types of electronic devices to which the signal transmission control device may be applied are not limited to those described above and may vary in various ways.

A device according to an embodiment of the present disclosure may include two inverted split ring resonators ISRRs which are physically separated from each other but indirectly connected through a common conductive line (e.g., a microstrip line). For example, a device according to an embodiment of the present disclosure may be a compact microwave device. Unidirectional (non-reciprocal) zero reflection and high absorption (e.g., almost perfect absorption) may be achieved from a simple structure including double ISRRs arranged at a given mutual distance. Double ISRRs may exchange energy with the shared environment and may be indirectly coupled to each other through traveling waves flowing along a conductive line. The reinforcement and destructive interference of traveling waves may be simply manipulated by adjusting the mutual distance of double ISRRs so that traveling wave-induced transparency similar to EIT may be obtained. Furthermore, the experimentally observed high non-reciprocity and near-zero reflections may be due to destructive interference between direct reflections by the first ISRR, and destructive interference between multiple reflections involving the second ISRR. For example, destructive interference may occur at a single frequency, i.e., a transparency peak due to a traveling wave, for a given mutual distance. Embodiments of the present disclosure may provide an understanding for the traveling-wave-induced indirect coupling effect which leads to new unidirectional, reflectionless absorption at the corresponding EIT-like peak depending on the mutual distance. Furthermore, the devices and the related phenomena according to embodiments of the present disclosure may affect microwave circuits, quantum information devices, etc.

According to the embodiments of the present disclosure described above, it is possible to implement a signal transmission control device which may secure excellent signal control characteristics with a significantly simpler structure than the existing methods. Furthermore, according to embodiments of the present disclosure, it is possible to implement a signal transmission control device which may secure excellent performance even with a simple structure and small size. In addition, according to embodiments of the present disclosure, it is possible to implement a signal transmission control device which is easy to manufacture in a small size and whose frequency of use may be expanded to a range of several terahertz (THz) or more. According to one embodiment, a signal transmission control device with excellent signal control characteristics may be implemented by using indirect interaction between two inverted split ring resonators (ISRRs) using traveling wave phase interference. The transmittivity, reflectivity, and absorptivity of the signal transmission of the signal transmission control device may be easily adjusted by adjusting the distance (gap) between the two inverted split ring resonators (ISRRs). Furthermore, unidirectional reflectionless absorption (e.g., unidirectional reflectionless nearly perfect absorption) characteristics may be implemented with a simple configuration without complicated design by using structures and methods according to embodiments of the present disclosure. The signal transmission control devices according to embodiments may be beneficial in that it may be easily manufactured in small sizes, the frequency of use may be expanded to several terahertz (THz) or more, and high usability and freedom may be realized. The signal transmission control devices according to embodiments of the present disclosure may be usefully used in various electronic devices.

In this specification, some embodiments have been disclosed, and although specific terms have been used, they are used to easily explain the technological content of the present disclosure and to help understanding embodiments of the present disclosure, and they are not used to limit the scope of various embodiments of the present disclosure. It is obvious to those having ordinary skill in the related art to which the present disclosure belong that other modifications based on the technological idea of the present disclosure may be implemented in addition to the embodiments disclosed herein. It will be understood to those having ordinary skill in the related art that in connection with the signal transmission control device and electronic device including the same according to the embodiments described with reference to FIGS. 1 to 13D, various substitutions, changes, and modifications may be made. Therefore, the scope of the invention should not be determined by the described embodiments, but should be determined by the technological concepts described in the claims.

EXPLANATION OF SYMBOLS

Reference Numerals of Various Parts of the Drawings

10: conductive layer
20: dielectric layer
100: signal transmission control device
A1: first opening pattern
A2: second opening pattern
D10: device layer
G1: first gap region
G2: second gap region
L10: conductive line
P1: first port
P2: second port
R10: first inverted split ring resonator
R20: second inverted split ring resonator

What is claimed is:

1. A signal transmission control device comprising:

a device layer including a conductive layer and a dielectric layer disposed on the conductive layer, wherein the device layer defines a first inverted split ring resonator (ISRR) and a second inverted split ring resonator (ISRR) that are spaced apart from each other; and a conductive line disposed on the dielectric layer and extending across the first ISRR and the second ISRR, wherein a signal transmission characteristic between a first end and a second end of the conductive line is controlled by the first ISRR and the second ISRR, and wherein the first ISRR has a gap orientation rotated by about 90° with respect to the first end of the conductive line, and the second ISRR has a gap orientation rotated by about 180° with respect to the first end of the conductive line.

2. The signal transmission control device of claim 1, wherein the first ISRR and the second ISRR have different resonance frequencies.

3. The signal transmission control device of claim 2, wherein:

the first ISRR has a first resonance frequency;

the second ISRR has a second resonance frequency; and the signal transmission control device has electromagnetically induced transparency (EIT) characteristic in a frequency range between the first resonance frequency and the second resonance frequency.

4. The signal transmission control device of claim 2, wherein:

the first ISRR has a first resonant frequency;

the second ISRR has a second resonant frequency; and the signal transmission control device has a signal transmission characteristic of about 80% or more in a frequency range between the first resonance frequency and the second resonance frequency.

5. The signal transmission control device of claim 4, wherein the signal transmission control device has the signal transmission characteristic of about 90% or more in the frequency range between the first resonance frequency and the second resonance frequency.

6. The signal transmission control device of claim 2, wherein:

the first ISRR has a first resonance frequency;

the second ISRR has a second resonance frequency; and the signal transmission control device has an asymmetric signal reflection characteristic depending on a signal transmission direction between the first end and the second end of the conductive line in a frequency range between the first resonance frequency and the second resonance frequency.

7. The signal transmission control device of claim 1, wherein transmittivity, reflectivity, and absorptivity of signal transmission between the first end and the second end of the conductive line are adjusted according to a distance between the first ISRR and the second ISRR.

8. The signal transmission control device of claim 7, wherein the distance is between a pair of adjacent edges of a first opening pattern of the first ISRR and a second opening pattern of the second ISRR.

9. The signal transmission control device of claim 7, wherein the distance is adjusted to make the signal transmission control device have a unidirectional reflectionless absorption characteristic.

10. The signal transmission control device of claim 9, wherein the unidirectional reflectionless absorption characteristic is defined as a characteristic having signal reflection of about 10% or less and signal absorption of about 90% or more with respect to a specific direction.

11. The signal transmission control device of claim 1, wherein the signal transmission control device has a unidirectional reflectionless absorption characteristic, and wherein the unidirectional reflectionless absorption characteristic is defined as a characteristic having signal reflection of about 10% or less and signal absorption of about 90% or more with respect to a specific direction.

12. The signal transmission control device of claim 1, wherein the first ISRR includes a first opening pattern formed as a shape of a quadrangle split ring in a first region of the conductive layer, and wherein the second ISRR includes a second opening pattern formed as a shape of a quadrangle split ring in a second region of the conductive layer.

13. The signal transmission control device of claim 1, wherein the conductive line is disposed on the first ISRR and the second ISRR to cross a central portion of each of the first ISRR and the second ISRR.

14. The signal transmission control device of claim 1, wherein an electrical signal is input to any one of the first end and the second end of the conductive line, and electromagnetic waves are generated in the conductive line by the electrical signal.

15. An electronic device comprising the signal transmission control device according to claim 1.

* * * * *